US006426961B1

(12) United States Patent
Nimmagadda

(10) Patent No.: US 6,426,961 B1
(45) Date of Patent: Jul. 30, 2002

(54) METHOD AND SYSTEM FOR SELECTION OF MODE OF OPERATION OF A SERVICE IN LIGHT OF USE OF ANOTHER SERVICE IN AN ADSL SYSTEM

(75) Inventor: Prasad Nimmagadda, Norcross, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/146,201

(22) Filed: Sep. 2, 1998

(51) Int. Cl.$^7$ ................................................. H04J 1/02
(52) U.S. Cl. ....................... 370/493; 370/465; 370/480
(58) Field of Search ............................. 379/399, 93.01, 379/93.08, 93.09; 375/222; 370/493, 494, 495, 465, 537

(56) References Cited

U.S. PATENT DOCUMENTS

| 4,757,495 | A | | 7/1988 | Decker et al. | |
|---|---|---|---|---|---|
| 4,852,151 | A | | 7/1989 | Dittakavi et al. | |
| 5,812,786 | A | * | 9/1998 | Seazholtz et al. | 395/200.63 |
| 6,005,873 | A | * | 12/1999 | Amit | 370/494 |
| 6,061,392 | A | * | 5/2000 | Bremer et al. | 375/222 |
| 6,118,780 | A | * | 9/2000 | Dunn et al. | 370/355 |
| 6,141,356 | A | * | 10/2000 | Gorman | 370/493 |

FOREIGN PATENT DOCUMENTS

WO    WO 98/38787    9/1998

OTHER PUBLICATIONS

*Splitterless DMT System Design and Measurements*, ITU Online Temporary Document, www.aware.com.
*Splitterless G.Lite interoperability with ANSI 1.413 and/or G.DMT*, ITU Online Temporary Document, www.aware.com.
"Loop Plants, Impairments and Testing. In–Line Low–Pass Filter Requirements and Design Guide," Universal ADSL (Asymmetric Digital Subscriber Line), U–ADSL Framework Document, Revision 1.1, Jun. 15, 1998.
"Terms of Reference Implementation Guide," Universal ADSL (Asymmetric Digital Subscriber Line), U–ADSL Framework Document, Revision 1.2, Jun. 15, 1998.

* cited by examiner

Primary Examiner—Alpus H. Hsu
Assistant Examiner—T Tran
(74) Attorney, Agent, or Firm—Kilpatrick Stockton LLP

(57) ABSTRACT

Methods and systems for use in connection with an asymmetrical digital subscriber line (ADSL) system being available to provide voice service and data service to the customer's premises. One service of the voice service or the data service is in use at the customer's premises, and the exemplary methods and systems detect a request for provision of the other service. In response to the detection, impact information may be provided on performance of the one service in light of concurrent use of the other service. A list of modes of operation of the other service is provided. The subscriber may consider the impact information and the list of modes and respond with a selected mode of operation of the other service. The selected mode is detected and the other service is operated pursuant to the selected mode to the customer's premises.

22 Claims, 6 Drawing Sheets

METHOD AND SYSTEM FOR SELECTION OF MODE OF OPERATION OF A SERVICE IN LIGHT OF USE OF ANOTHER SERVICE IN AN ADSL SYSTEM

FIELD OF THE INVENTION

This invention generally relates to telecommunications, and particularly relates to the use of voice service and data service in an asymmetrical digital subscriber line (ADSL) system in the local loop between a central office of a telecommunications network and a customer's premises.

BACKGROUND

New technologies are being developed to increase the capacity and bandwidth of telecommunications networks. One of these new technologies provides for the use of an asymmetric digital subscriber line (ADSL) system in the local loop between a central office of a telecommunications network and a customer's premises served by that central office. An ADSL system makes use of the existing twisted pair wiring provided to the customer's premises to deliver the voice service including plain old telephone service (POTS) and to deliver data service including data signals such as may be used to communicate over the Internet. Advantageously, the ADSL system allows a customer to engage in a telephone call while also engaging in digital communications such as by interacting with the Internet. Additional information regarding ADSL systems may be obtained from American National Standards Institute Standard ANSI-Ti.413-1995, which is incorporated herein by reference.

FIG. 1 illustrates an ADSL system 10 such as may be used in a local loop between a customer's premises 12 and a central office 14 of a telecommunications network that serves the customer's premises 12. In the central office 14, voice signals from a switch 16 are combined with data signals from an ADSL modem 18. This combination of voice signals and data signals typically takes place in a splitter 20, which then transmits the combined signals over the twisted pair wiring 22 serving the customer's premises. The splitter 20 in the central office 14 earns its name when combined signals are received in the central office 14 from the customer's premises over the twisted pair wiring 22. The splitter 20 splits the combined signals into voice signals which are transmitted to the switch 16, and into data signals which are transmitted to the ADSL modem 18.

Referring again to the case where the splitter 20 in the central office 14 transmits the combined signals over the twisted pair wiring 22 serving the customer's premises 12, these combined signals are received at a splitter 24 in the customer's premises 12. This splitter 24 also earns its name by splitting the combined signals into voice signals and data signals. The voice signals are transmitted to the telecommunications devices 26 in the customer's premises 12, thereby providing voice service. The data signals are transmitted to the data devices in the customer's premises, thereby providing data services. For example, the splitter 24 provides data signals to an ADSL modem 28 which performs the appropriate demodulation and provides the demodulated data signals to a computer 30. The splitter 24 in the customer's premises also transmits combined signals from the customer's premises 12 to the central office 14. In particular, the splitter 24 receives voice signals from a telecommunications device 26 and combines these voice signals with data signals received from the computer 30 via the ADSL modem 28. The splitter 24 transmits the combined signals over the twisted pair wiring 22 to the central office 14. By this described configuration, the ADSL system 10 simultaneously provides a customer with voice service and data service so that a customer may use his or her computer 30 while he or she (or another individual) makes use of the telephone 26.

In the ADSL system 10 of FIG. 1, as noted, the splitter 24 in the customer's premises 12 is used substantially in two ways. First, the splitter 24 is used to split the combined voice and data signals transmitted from the central office 14 over the twisted pair wiring 22. Second, the splitter 24 is used to combine the voice signals from the customer's telecommunications device 26 with the data signals of the customer's computer 30 and to transmit the combined voice and data signals over the twisted pair wiring 22 to the central office 14. Based on both of these uses, the splitter 24 must be installed on the customer's premises, which typically requires appropriate access and special wiring to make the proper connections. These requirements present problems to the telecommunications service provider and are viewed as complications by the customer. To the service provider, these requirements are costly and inconvenient. To the customer, these requirements of an ADSL system seem complex in comparison to the familiar use of an analog modem. Typically, a customer simply plugs the analog modem into a telecommunications outlet and programs the computer appropriately. To install an analog modem, generally special wiring and connections are unnecessary. Of course, an analog modem does not provide the advantage of an ADSL system whereby the customer may simultaneously use voice services and data services. Yet, the problems presented by the splitter 24 in the customer's premises 12 are obstacles to the further deployment of ADSL systems.

As illustrated in FIG. 2, to overcome the problems presented by the splitter 24 in the customer's premises 12, an ADSL system 32 without a splitter in the customer's premises 12 is currently being developed. Generally, such an ADSL system 32 includes ADSL modems that operate at lower power than the ADSL modems in an ADSL system 10 with a splitter in the customer's premises. Additional information regarding an ADSL system without a splitter in the customer's premises may be obtained from Universal ADSL Working Group, an industry consortium formed to develop Universal ADSL standards. Further information may be obtained also from the following documents which are incorporated herein by reference: U-ADSL Framework Document—Terms of Reference, Implementation Guide, Rev. 1.2 (Jun. 15, 1998), Universal ADSL Working Group; and U-ADSL Framework Document—Loop Plants, Impairments and Testing. In-Line Low-Pass Filter Requirements and Design Guide, Rev. 1.2 (Jun. 15, 1998).

A comparison of FIG. 2 to FIG. 1 reveals that in the central office 14 the configuration of the ADSL system 32 without a splitter is the same as the configuration of the ADSL system 10 with a splitter. The principal differences between the ADSL systems 10, 32 are in the customer's premises.

In the ADSL system 32 without a splitter, the combined voice and data signals transmitted over the twisted pair wiring 22 from the central office 14 are received in the customer's premises 12 and are provided to both the customer's telecommunications devices and to the customer's data devices. In particular, in providing the combined voice and data signals to the telecommunications devices, the combined signals are received in the customer's premises 12 and provided over connection 34 to an optional low pass filter (LPF) 36 which is connected in series to the customer's telecommunications device 26. The low pass filter 36 passes the voice signals (0–4 KHz) to the telecommunications device 26, but significantly blocks the other signals. In providing the combined voice and data signals to the data devices, the combined signals are received in the customer's premises 12 and provided over connection 38 to a high pass filter (HPF) 38 which is connected in series to the ADSL modem 28. The high pass filter 38 passes the data signals (above 20 KHz) to the ADSL modem 28, but blocks the other signals. The ADSL modem 28, in turn, then transmits the data signals to the computer 30.

The ADSL system 32 illustrated in FIG. 2 has done away with the problems of a splitter 24 in the customer's premises. But the ADSL system 32 without a splitter in the customer's premises 12 has its own set of problems. Principally, these problems concern the degradations in the respective voice services and data services that occur when both services are in use. For example, consider the experience of a customer having the ADSL system 32 for the delivery of voice service and data service. When the customer is using his or her computer 30 and receiving data service through the ADSL system 32, the customer may experience a degradation in the data service if the telecommunications device 26 connected to the ADSL system 32 is used so that voice service use at the same time as the data service. The degradation in the data service generally includes a slow down in the delivery of the data. On the other hand, when the customer is engaged in a telephone call and using the voice service, the customer may experience a degradation in the voice service if the computer 30 is used so that data service is operated at the same time as the voice service. The degradation in the voice service generally includes audible noise such as a hum that may be heard through the receiver of the telecommunications device. In sum, degradations may occur in both services when they are used at the same time.

These degradations in the data service and the voice service are partially the result of harmonic noise. In addition, the degradations may be generally attributable to the effects of the wiring, connections and other devices that may be present in or relatively near the customer's premises or may be connected at the customer's premises 12 to the ADSL system 32. Thus, the degradations in the data service and in the voice service are likely to vary from customer to customer.

As noted, in addition to providing high data rate access using the local loop, a principal advantage of an ADSL system is that it allows a customer to make use of his or her telecommunications devices and data devices at the same time. As also noted, a problem of an ADSL system is the degradation that may occur to one or both of the services supplied by the ADSL system when the services are used at the same time. In some cases, the advantage of being able to use both voice services and data services at the same time may outweigh any problem caused by the degradations. For example, a customer who is engaged in a social call with a friend may tolerate the degradation in the audio quality of the telephone call so as to browse the Internet at the same time as talking to his or her friend. As another example, a customer who is browsing the Internet for fin and entertainment may tolerate the degradation in the data service such as a data slow down when at the same time the customer's daughter or son uses the telephone to call a friend for help with school work.

Nevertheless, there are other cases when the advantage of being able to use voice devices and data devices at the same time may be outweighed by the degradations that are caused by the simultaneous use of both services. For example, the customer who may tolerate the degradation in the audio quality when engaged in a social call may not be able to tolerate the degradation when engaged in a business call. As a result, the customer may have to forego making or receiving business calls through his or her ADSL system. As another example, the customer who may tolerate the degradation in the data service when using it for fun and entertainment may not tolerate the degradation when the data service is being used for business. As a result, the customer may have to forego using the data service for business purposes when the voice service is being used. In either case, even though the customer may be able to tolerate degradations to either the voice service or data service in certain cases, the customer may have to completely forego simultaneous use of the services because the customer cannot tolerate degradations in all cases.

In sum, there is a need in an ADSL system 32 whereby a customer may be provided with options with respect to the use of an ADSL system such that the customer may choose to use or not to use data service and voice service at the same time, or may choose to operate or use one or the other of the services in a mode that is selected with consideration of the impact of the concurrent use of the services.

SUMMARY OF THE INVENTION

The advantages of subscription to an ADSL system derive principally from: a) high speed data access using the local loop; and b) the ability to use voice service and data service at the same time over conventional twisted pair wiring. The present invention adds to these advantages by allowing a subscriber to maximize the use of either or both voice service and data service depending upon the circumstances. The present invention includes embodiments that allow a subscriber to intelligently manage the operation of data service and/or voice service in an ADSL system.

Stated generally, the present invention includes methods and systems that may be used in an ADSL system used in the local loop between a telecommunications network and a customer's premises. As noted, an advantage of an ADSL system is the ability to use voice service and data service simultaneously at the customer's premises. The present invention may be used when one service as between the voice service or the data service is being used with respect to the customer's premises. In particular, an exemplary method of the present invention provides the subscriber with choice for selecting a mode of operation of the other service. In particular, this exemplary method causes the ADSL system to detect a request for the other service; to display a list of modes of operation; to detect receipt of a selected mode from the list; and to operate the other service pursuant to the selected mode to the customer's premises. To aid the subscriber in choosing a mode of operation, the exemplary method may cause the ADSL system to provide impact information on performance of the one service in light of concurrent use of the other service. For example, the delivery of data service may be degraded due to concurrent use of the other service. The impact information also may include the effect of the one service on the other service when the other service is used concurrently with the one service. For example, the effect of the concurrent use of the data service on the voice service may be that the voice service suffers from noise or hum on the line.

More particularly described, another exemplary method of the present invention allows a subscriber to choose a selected mode of operation of a data service when a voice service is already being used by the subscriber in an ADSL system. When the subscriber makes a request for data service, the exemplary method causes the ADSL modem on the customer's premises to make a detection of the voice service being used with respect to the telecommunications device at the customer's premises. In response to the detection, the ADSL modem provides the detection to the computer or other data device of the subscriber. In response to receiving the detection from the ADSL modem, the computer displays a list of modes of operation. This list may include a full power mode, a low power mode, a wait mode, and/or a rescind mode. In the wait mode, one service is effectively put on hold until the other service is discontinued. For example, the data service may be put into wait mode until a telephone conversation is ended so that the noise levels in voice service are minimized. As yet another mode, the exemplary embodiments provide the subscriber with an opportunity to rescind his or her request for service, and this is referred to as a rescind mode. Those skilled in the art will understand that other modes of operation (such as an intermediate power mode) may be provided.

In addition, the impact information may include information on the service performance of each of the modes of operation in the list. Further, the computer may display impact information on the performance of the data service in light of concurrent use of the voice service. For example, the impact information may include data on the degradation of the full power mode and/or the low power mode of the data service in light of the concurrent use of the voice service. The impact information also may include the effect of the data service on the voice service when the voice service is used concurrently with the data service. For example, the impact information may inform the subscriber that the effect of the full power mode of the data service on the voice service is to cause an amount of noise on the line. This amount may be precalculated or this amount may be measured in real-time under the existing circumstances.

In this exemplary method, the display of the modes of operation and impact information provides the subscriber with information so as to make an intelligent choice about the use of the data service in addition to the voice service. Once the subscriber makes a selection, the selected mode is received at the computer. The computer provides the ADSL modem with instructions to operate the data service pursuant to the selected mode. In response to receiving the instructions, the ADSL modem interacts with the ADSL system so as to operate the data service pursuant to the selected mode of operation. Advantageously, the data service is operated in a mode selected by the subscriber that best suits the subscriber's purposes and circumstances.

Another exemplary method allows a subscriber to preselect a mode of operation of a data service and to implement that preselected mode when a subscriber is using a voice service by an ADSL system. When the subscriber makes a request for data service, the exemplary method causes the ADSL modem on the customer's premises to make a detection of the voice service being used with respect to the telecommunications device at the customer's premises. In response to the detection, the ADSL modem provides the detection to the computer or other data device of the subscriber. In response to receiving the detection from the ADSL modem, the computer checks for a preselected mode of operation. If the computer finds the preselected mode of operation, then the computer provides the ADSL modem with instructions to operate the data service pursuant to the preselected mode of operation. In response to receiving the instructions, the ADSL modem interacts with the ADSL system so as to operate the data service pursuant to the preselected mode of operation. Advantageously, the data service is operated in the preselected mode so as to provide the subscriber with the advantage of choosing a mode of operation based on the purposes and circumstances of the subscriber, but without burdening the subscriber to make a selection in real-time. As another advantage, the preselected mode of operation may be overridden by the subscriber in any given case so that the subscriber has the option of changing the preselected mode of operation of the data service to comport better with his or her purposes or circumstances.

Yet another exemplary method of the present invention allows a subscriber to choose whether to change or continue a selected mode of operation of a data service when the data service is already in use and the subscriber desires to use voice service. In this exemplary method, the ADSL modem makes a detection of an off-hook indication with respect to the subscriber's telecommunications device. In other words, the ADSL modem takes note when the subscriber goes off-hook. In response to the detection, the ADSL modem provides the detection to the computer. In response to receiving the detection from the ADSL modem, the computer provides impact information on performance of the data service in light of concurrent use of the voice service. The impact information may include the effect of the data service on the voice service when the voice service is used concurrently with the data service. For example, the data service operated in a full power mode may result in a relatively high level of noise on the line of the subscriber's telephone. On the other hand, the low power mode may result in about the same level of noise on the line. After receiving the detection of the off-hook indication, the computer may display a list of modes of operation. The subscriber may take the impact information into consideration and provide an indication of a selected mode. In response to receiving the selected mode, the computer provides the ADSL modem with instructions to operate the data service pursuant to the selected mode. In response to receiving the instructions, the ADSL modem interacts with the ADSL system so as to operate the data service pursuant to the selected mode of operation.

An additional exemplary method of the present invention provides for the transmittal of impact information to the customer's premises from the telecommunications network. In this exemplary method, the telecommunications network detects an off-hook indication with respect to the telecommunications device on the customer's premises. For example, the central office serving the customer's premises detects the customer has taken a telephone off-hook. In response to the detection, the telecommunications network makes a determination that the data service is in use at the customer's premises. For example, the central office may communicate with the ADSL modem disposed in the central office (or other appropriate equipment) to check whether data service is being used at the customer's premises, and find that the data service is being used.

In response to finding that data service is being used at the customer's premises, then the telecommunications network provides an announcement to the telecommunications device that has gone off-hook. In particular, the announcement includes impact information with respect to the performance of the one service as between the voice service and data service in light of the concurrent use of the other service. The impact information may include the effect of the one service on the other service when the other service is used concurrently with the one service.

For example, the central office may determine that the data service is being used at the customer's premises and provide this determination as well as other information to an intelligent peripheral in the telecommunications network. Based on the determination and the other information, the intelligent peripheral may be connected to the voice service to the customer's premises so as to provide an announcement of the impact information.

As well as providing the impact information from the telecommunications network, this exemplary method may provide that the telecommunications network announce a list of modes of operation of the data service. As noted above, these modes may include a full power mode, a low power mode, a rescind mode, and a wait mode. For example, when the subscriber goes off-hook, he or she may be provided with the impact information and the list of modes. In response to the list of modes, the subscriber selects a mode and transmits this selection to the telecommunications network. For example, the customer may be prompted to push a certain keypad on the telephone if the customer desires full power mode, a different keypad if the customer desires low power mode, etc. As a result of the push of a keypad, a dual tone multiple frequency (DTMF) signal is transmitted in a conventional manner to the telecommunications network. The telecommunications network receives the selected mode and provides the ADSL system with instructions to operate the data service pursuant to the selected mode. In response to the instructions, the ADSL system operates the data service pursuant to the selected mode of operation. Advantageously, the data service is operated in a mode selected by the subscriber that best suits the subscriber's purposes and circumstances.

In addition to the exemplary methods summarized above, the present invention also includes exemplary systems that may be used in an ADSL system in the local loop between the telecommunications network and a customer's premises. These exemplary system share many of the same features and advantages of the exemplary methods summarized above. An example of such a system allows a subscriber to have one service of the voice service or data service provided by an ADSL system operated pursuant to a selected mode of operation in light of the other service being concurrently used. For example, a subscriber may specify that the data service be operated pursuant to a selected mode in light of the voice service being concurrently operated. This exemplary system includes an ADSL modem that detects that one of the services is being used and that a request for the other service has been made. For example, the ADSL modem may detect the voice service being used at the customer's premises and provides the detection to the subscriber's computer. Advantageously, the feature of detection of the use of voice service may alert the subscriber to a condition of which he or she was previously unaware, i.e., the off-hook indication of one or more of his or her telecommunication devices. The subscriber may not be aware of an improper hang-up of a telephone which causes degradation of ADSL rates. Once informed of the off-hook indication, the subscriber may hang up the telephone and continue with the use of only data service.

In response to receiving the detection from the ADSL modem, the computer displays a list of modes of operation. As with the exemplary embodiments, the modes of operation of the data service may include a full power mode, a low power mode, a wait mode, and/or a rescind. The computer may also display impact information on the performance of the one service in light of the other service. For example, the impact information may include performance of the voice service in light of concurrent use of the data service. In addition, the impact information may include the effect of the one service on the other service. For example, the impact information may include the effect of the data service on the voice service when the voice service is used concurrently with the data service. Advantageously, the subscriber may consider the impact information and select a mode of operation of the data service in light of the voice service. The computer receives a selected mode from the list, and provides the ADSL modem with instructions to operate the other service pursuant to the selected mode. The ADSL modem, in response to receiving the instructions, interacts with the ADSL system so as to operate the other service pursuant to the selected mode of operation. An advantage of the exemplary system is that few modifications of an ADSL system (without a splitter in the customer's premises) are necessary for implementation of the present invention.

Another exemplary system of the present invention provides for the transmittal of impact information to the customer's premises from the telecommunications network. In this exemplary system, a switch in the telecommunications network detects an off-hook indication with respect to the telecommunications device of the subscriber. In response to this detection, the switch communicates with the ADSL modem in the central office (or other appropriate ADSL modem) to check whether the data service is in use in the customer's premises. Based on a determination that the data service is in use, then the switch sends a message to an intelligent peripheral in the telecommunications network. The message may inform the intelligent peripheral of the off-hook indication with respect to the telecommunications device at the customer's premises and the determination that the data service is in use at the customer's premises. The switch may provide the intelligent peripheral with other information as necessary. Alternatively, the switch may simply inform the intelligent peripheral of the off-hook indication, and the intelligent peripheral may communicate with the appropriate ADSL modem as to whether data service is in use at the customer's premises.

In response to the message from the switch, the intelligent peripheral may be connected to the voice service to the customer's premises so as to provide an announcement of the impact information. The impact information may include information on performance of the one service in light of the concurrent use of the other service. The impact information also may include the effect of the one service on the other service when the other service is used concurrently with the one service. As well as providing the impact information, this exemplary system may provide that the intelligent peripheral announce a list of modes of the data service to the telecommunications device. As noted above, these modes may include a full power mode, a low power mode, a rescind mode, and a wait mode. For example, when the subscriber goes off-hook, he or she may be provided with the impact information and the list of modes. In response to the list of modes, the subscriber selects a mode and transmits this selection to the telecommunications network. The intelligent peripheral receives the selected mode and provides the ADSL system with instructions to operate the data service pursuant to the selected mode. In response to the instructions, the ADSL system operates the data service pursuant to the selected mode of operation. Advantageously, the data service is operated in a mode selected by the subscriber that best suits the subscriber's purposes and circumstances.

In sum, the present invention includes exemplary methods and systems for use in connection with an ADSL system whereby a customer may be provided with options with respect to the use of the ADSL system. The customer may choose to use or not to use data service and voice service at the same, or may choose to operate one or the other of the services in a mode that is selected with consideration of the impact of the concurrent use of the services.

That the present invention including the exemplary embodiments described herein overcomes the drawbacks set forth in the background and accomplishes the objects of the invention set forth herein will become apparent from the drawings and detailed description set forth below.

DETAILED DESCRIPTION

The present invention includes embodiments that allow a subscriber to intelligently manage the use of data service and/or voice service in an ADSL system of a telecommunications network. Exemplary embodiments of the present invention are described beginning with an overview presented with the block diagram of an ADSL system without splitter of FIG. 2 and the flow diagram of FIG. 3, continuing with additional detail with the state diagram of FIG. 4, and concluding with particular examples presented with the block diagram of FIG. 5 and the flow diagram of FIG. 6.

Figure 2:
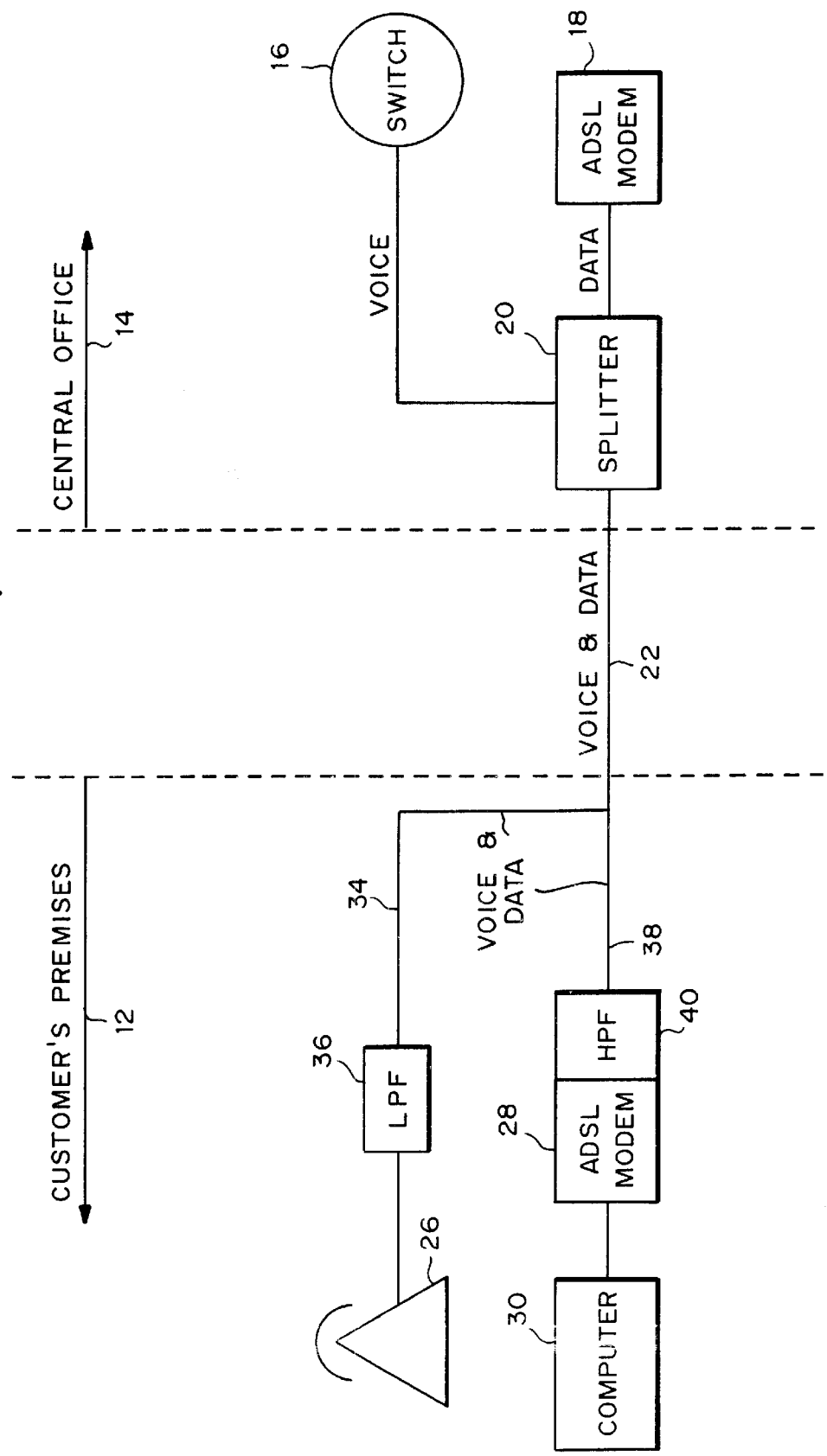
FIG. 2 illustrates an ADSL system without a splitter in the customer's premises.
Figure 3:
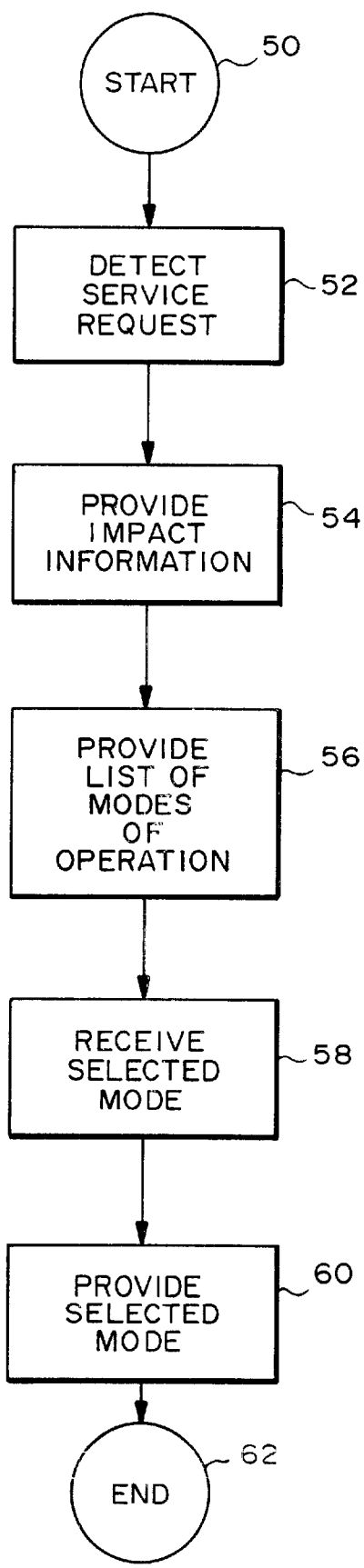
FIG. 3 is a flow diagram of the general steps taken by an exemplary embodiment of the present invention.

Overview—FIGS. 2 and 3

As noted in the background, an ADSL system is used typically in the local loop between a central office of a telecommunications network and a customer's premises served by that central office. An ADSL system makes use of the twisted pair wiring provided to the customer's premises to deliver voice service in the frequency band of 0–4 KHz and to deliver data service in the frequency band of 20 KHz–1.1 MHz. A subscriber may receive just voice service over the ADSL system for use with his or her telecommunications devices such as telephones, facsimile machines, analog modems, etc. As an alternative, a subscriber may receive just data service over the ADSL system for use with his or her data devices such as computers, digital modems, etc. But the advantages of subscription to an ADSL system also include the ability to use voice service and data service at the same time. The present invention adds to these advantages by allowing a subscriber to maximize the use of either or both voice service and data service depending upon the circumstances.

FIG. 3 is a flow diagram used to illustrate the general steps taken by an exemplary method of the present invention. Pursuant to this example, assume a subscriber has subscribed to an ADSL system 32 without splitter such as illustrated in FIG. 2. Also assume the ADSL system is available so that voice service and data service may be used at customer's premises. In addition, assume either the voice service or the data service is being used at the customer's premises. Further, assume the subscriber has decided to make use of the other of the services and has initiated a service request. If the subscriber desires to obtain voice service for a telephone in addition to data service already in use, then the service request may be as simple as the off-hook status of the telephone. On the other hand, if the subscriber desires to use data service in addition to voice service already in use, then the service request may be as simple as the attempt at connection to the Internet by the computer 30.

After the start 50 in FIG. 3, in step 52 an exemplary embodiment of the present invention detects the service request. In response to the service request, in step 54 impact information is provided. In particular, the impact information may include information on the performance of one service in light of concurrent use of the other service. In addition, the impact information may include information on the effect of the one service on the other service when both services are used concurrently.

After the impact information is provided, in step 56 a list of modes of operation is provided. The subscriber may evaluate the impact information so as to intelligently choose the mode of operation that best suits his or her purposes or circumstances. In step 58, the selected mode is received, and in step 60 the selected mode is provided in the operation of the service. The exemplary method ends in step 62.

Figure 4:
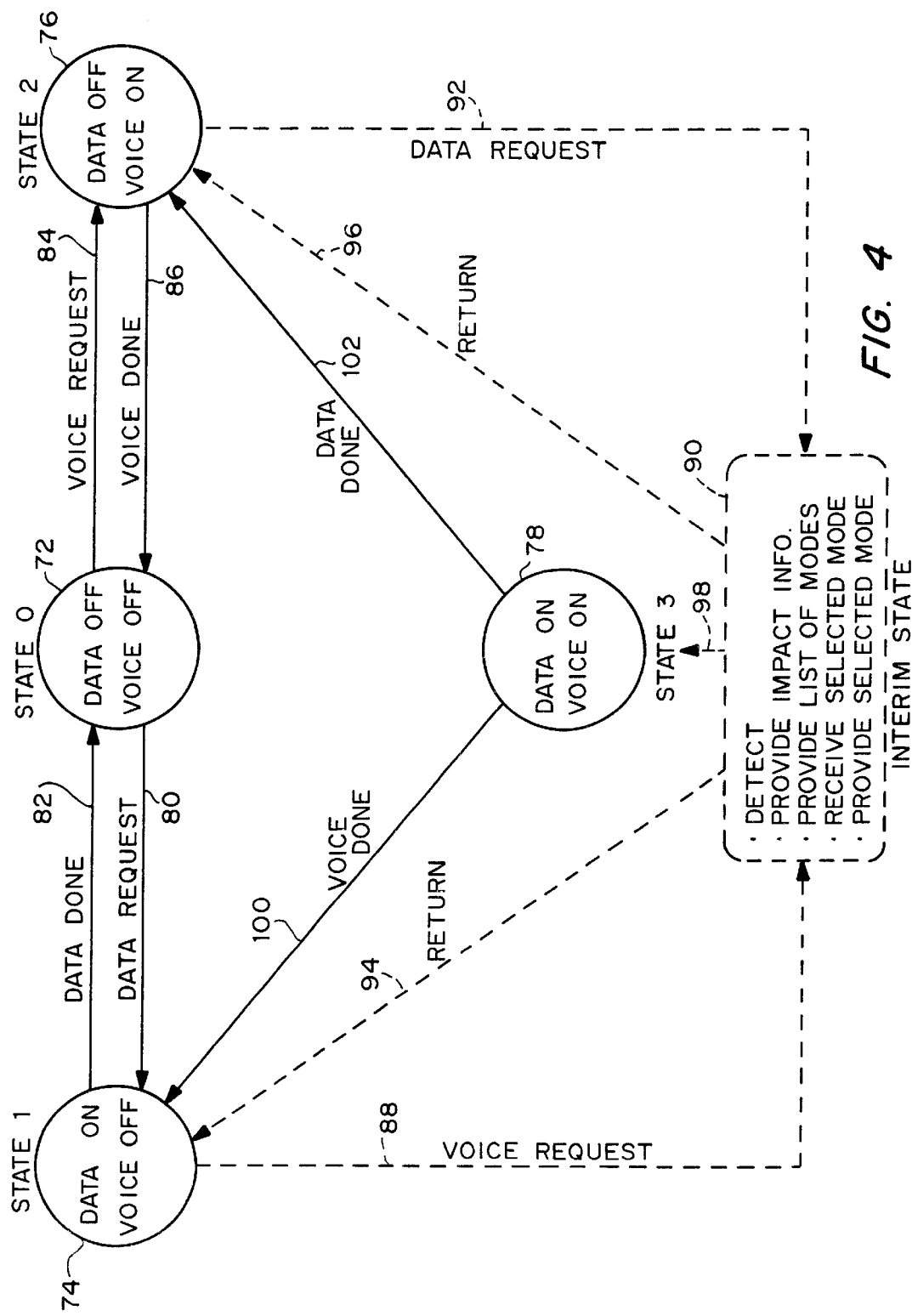
FIG. 4 is a state diagram illustrating relationships among states of an exemplary embodiment of the present invention.

State Diagram—FIG. 4

The state diagram illustrated in FIG. 4 provides visual aids in understanding the relationship of the features of the exemplary embodiments of the present invention with respect to the use of voice service and data service by a subscriber of an ADSL system. As explained below, in contrast to the solid arrows and solid outlines of four states in the diagram, the dashed arrows and the dashed outline of a state highlight some of the differences provided by exemplary embodiments of the present invention. Four states are illustrated: State 0 (data off, voice off) 72; State 1 (data on, voice off) 74; State 2 (data off, voice on) 76; and State 3 (data on, voice on) 78. These four states and the transitions therebetween are described below.

At the beginning of subscription service (as well as at other times), the subscriber is not using voice service or data service from the ADSL system. So, as noted, in State 0 72—data service is not being used (data off) and voice service is not being used (voice off). At some point, the subscriber requests a service. If the subscriber requests data service as indicated by data request arrow 80, then the status of the services moves to State 1 74—data service is used (data on), but voice service is not being used (voice off). When the subscriber is done with the data session and data service is terminated as indicated by data done arrow 82, then the status of the services return to State 0 72. Rather than data service, if the subscriber requests voice service as indicated by voice request arrow 84, then the status of the services moves to State 2 76—data service is not used (data off), but voice service is used (voice on). When the subscriber is done with the voice session and voice service is terminated as indicated by voice done arrow 86, then the status of the services return to State 0 72.

The subscriber may desire to take advantage of the ADSL system by concurrently using voice service and data service. Ordinarily, the status of the services would move from the state with no services—State 0 (data off, voice off) 72 through either of the two states with one service being used—State 1 (data on, voice off) 74 or State 2 (data off, voice on) 76 to the state with two services being used—State 3 (data on, voice on) 78. But prior to proceeding to the state wherein both services are used, the exemplary embodiments of the present invention include an Interim State 90. In this Interim State 90, the subscriber may be provided with impact information and with a list of modes of operation so as to allow the subscriber to reconsider whether he or she desires to use both services in light of the circumstances, and if so, in what modes the respective services are to be operated.

More particularly described, in the exemplary embodiments, if the status of a subscriber's services is in State 1 (data on, voice off) 74 and the subscriber desires to use voice service, then the status of the service moves from State 1 74 as indicated by dashed voice request arrow 88 to the Interim State 90. Similarly, if the status of a subscriber's services is in State 2 (data off, voice on) 76 and the subscriber desires to use data service, then the status of the service moves from State 2 86 as indicated by dashed data request arrow 92 to the Interim State 90.

In the Interim State 90, generally, the steps described above in connection with the exemplary method of FIG. 3 are carried out. In particular, the subscriber's request for the service is detected. Impact information is provided. Typically, the impact information may include information on the performance of one service in light of concurrent use of the other service. In addition, the impact information may include information on the effect of the one service on the other service when both services are used concurrently. A list of modes of operation is provided. The subscriber may evaluate the impact information so as to intelligently choose the mode of operation that best suits his or her purposes or circumstances. The selected mode is received. Finally, the selected mode is provided.

Interestingly, the selected mode may include an indication to decline the requested service. For example, based on the evaluation of the impact information, the subscriber may rescind his or her request for the service. In that case, the status of the services returns to one of the states wherein one type of service is being used by the subscriber. In particular, if the subscriber decides to rescind his or her decision for voice service, then the status of the services moves from Interim State 90 as indicated by dashed return arrow 94 to State 1 (data on, voice off) 74. If the subscriber decides to rescind his or her decision for data service, then the status of the services moves from Interim State 90 as indicated by dashed return arrow 96 to State 2 (data off, voice on) 76. Of course, the subscriber may opt to have the second service provided. In that case, as indicated by dashed arrow 98, the status of the services moves from Interim State 90 to the state having both services in use, to-wit: State 3 (data on, voice on) 78.

As noted, State 3 78 refers to the advantageous state allowed by an ADSL system wherein data service (data on) and voice service (voice on) are both provided to the subscriber. Of course, the subscriber may terminate one or the other service. Then, the status of the subscriber's services returns either as indicated by the voice done arrow 100 to State 1 (data on, voice off) 74 or as indicated by the data done arrow 102 to State 2 (data off, voice on) 76. From either State 1 74 or State 2 76, as explained above, the status of the services may return to State 0 72, if the subscriber terminates the remaining service.

In sum, the dashed arrows 88, 92, 94 and 96 and the dashed outline of Interim State 90 are visual aids to quickly understanding the advantages of the exemplary embodiments of the present invention. By following either dashed request arrow (voice request 88 or data request 92) towards the Interim State 90, the status of the services moves to the Interim State 90 wherein the subscriber is provided with an opportunity to reconsider the request for the additional service in light of impact information. Three (dashed) arrows point away from the Interim State 90. From the Interim State 90, the status of the services may move to any of three of the other states. In particular, the subscriber rescinds his or her decision to usethe additional service, then the status of the services returns to either State 1 74 or to State 2 76. If the subscriber decides to proceed, then the status of the service proceeds to State 3 78 wherein the status of the services is that they are both being provided. Thus, the dashed arrows 88, 92, 94, 96 and 98 and dashed Interim State 90 provide a visual aid for quick understanding of some of the advantages of the present invention.

Figure 5:
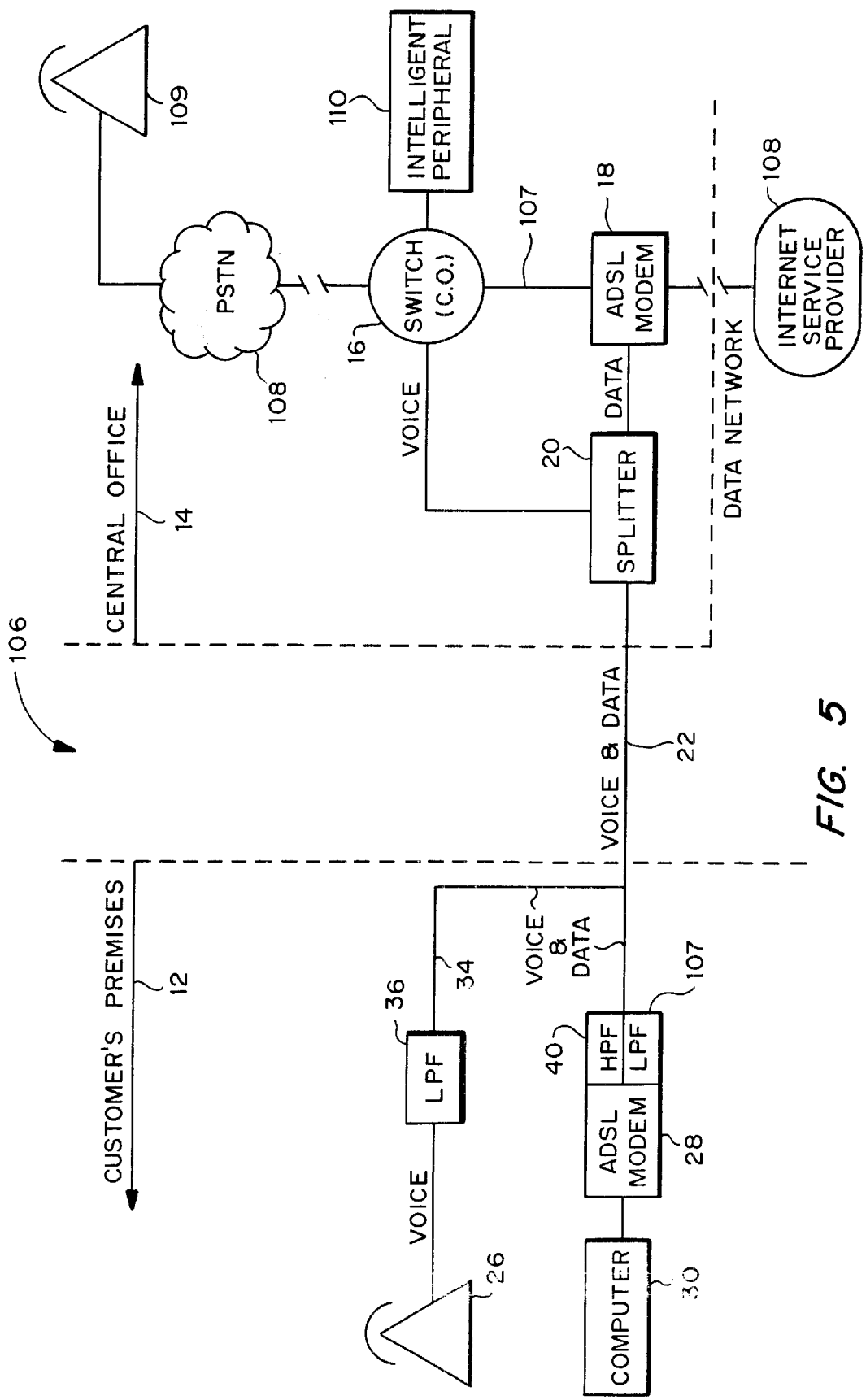
FIG. 5 illustrates an ADSL system such as may be used with exemplary embodiments of the present invention.

An Exemplary ADSL System—FIG. 5

FIG. 5 illustrates an exemplary ADSL system 106 such as may be used in an exemplary embodiment of the present invention. As explained below in connection with examples A and B, to implement any of the exemplary embodiments of the present invention, advantageously, few modifications of an ADSL system without a splitter in the customer's premises such as illustrated in FIG. 2 are necessary. In the customer's premises 12, upon subscription to an ADSL system with features of an exemplary embodiment of the present invention, the subscriber's data devices such as computer 30 are programmed to interface with the person operating the computer and with the ADSL system 106 so as to deliver some of the advantageous features of the exemplary embodiment. In particular, the computer 30 is programmed to interface with the ADSL modem 28 that is installed in association with the customer's premises 12 for use with the ADSL system 106. The computer 30 may include an ADSL modem and peripheral elements such as filters 40, 107 as a line card or other inclusive device(s) rather than as separate devices as illustrated in FIG. 5. The computer 30 or any other data device that receives data service in association with the subscriber's subscription to the ADSL system 106 need not be located on the customer's premises 12. Although in most cases these data devices will be located on the customer's premises 12, they may be otherwise located and connected so as to receive the data service provided through the subscriber's subscription to the ADSL system 106. For example, the subscriber may occasionally operate a portable computer that receives wireless transmissions including data. Analogously, the subscriber's voice devices need not be located on the customer's premises 12. For example, a subscriber may operate a wireless unit that receives wireless transmissions including voice service indirectly or directly connected to the ADSL system 106.

In exemplary embodiments of the present invention, the ADSL modem 28 associated with the customer's premises 12 is programmed or otherwise configured to interface with the computer 30 so as to provide information to the computer 30, and to receive instructions from the computer 30. The ADSL modem 28 is also programmed or otherwise configured to act on the instructions from the computer 30 by interfacing with the ADSL system 106 and with the voice devices such as telephone 26 (and connections thereto 34) of the customer's premises 12. In particular, the ADSL modem 28 is programmed to interact with the ADSL modem 18 in the central office 14 so as to deliver the features of the exemplary embodiments. As illustrated and explained above in connection with FIG. 2, the ADSL modem 28 is associated with a high pass filter (HPF) 40 to receive the data service from the ADSL system 106. The ADSL modem 28 also may include or be associated with a monitoring device illustrated as low pass filter (LPF) 107 that monitors the off-hook or on-hook status of the voice devices on the customer's premises or otherwise connected to the subscriber's connection to ADSL system 106. The monitoring device may include other elements such as a voltage detector and signal generator so as to accomplish its monitoring function and so as to provide information to the ADSL modem 28 regarding the off-hook status or on-hook status of the voice devices.

Advantageously, the subscriber's voice devices such as telephone 26 connected directly or indirectly to the voice service provided by the ADSL system 106 need not be altered to implement the exemplary embodiments of the present invention.

In the central office 14, in order to implement the exemplary embodiments of the present invention, the ADSL modem 18 is programmed or configured to interact over the voice and data line 22 with the ADSL modem 28 on the customer's premises 12. Advantageously, the functions of the ADSL modem 18 in communicating with data networks such as the illustrated Internet service provider 108 need not be altered to implement the exemplary embodiments of the present invention. In FIG. 5, the splitter 20 and ADSL modem 18 are illustrated as separate elements, but their respective functionalities may be included in a digital signal line (DSL) multiplexer/demultiplexer.

Advantageously, the functions of the switch 16 in the central office 14 in communicating over the public switched telephone network (PSTN) 108 to voice devices such as telephone 109 need not be altered to implement the exemplary embodiments of the present invention.

In an alternate embodiment, the features of an Advanced Intelligent Network (AIN) of the telecommunications network including the ADSL system 106 may be used. In this alternate embodiment, switch 16 (also referred to as "central office") is used to detect whether a subscriber's telecommunications device 26 has gone off-hook, and to take steps in response to an off-hook indication. In particular, the switch 16 may communicate with the ADSL modem 18 in the central office 16 to check whether data service is being used at the customer's premises. Thus, a direct or indirect connection 107 may be implemented between the appropriate elements of the switch 16 and the ADSL modem 18 to facilitate this communication. In addition, the ADSL modem 18 may be configured to be responsive to an inquiry from the switch 16 with respect to whether one or the other of the voice service or the data service is in use with respect to a customer's premises. This configuration of the ADSL modem 18 may take the form of programming.

Once the switch 16 has determined that data service is in use at the customer's premises, then the switch 16 may provide this determination as well as other information to an intelligent peripheral 110 (or other network element) in the telecommunications network. Alternatively, the switch 16 may simply inform the intelligent peripheral 110 (or other network element) of the off-hook indication, and the intelligent peripheral 110 may communicate with the appropriate ADSL modem as to whether data service is in use at the customer's premises 12. In FIG. 5, intelligent peripheral 110 is illustrated as connected directly to switch 16, but those skilled in the art will understand that the intelligent peripheral 10 may be located somewhere other than the central office 16 and may only be functionally connected to the switch 16. For example, the intelligent peripheral 110 may be a service circuit node (SCN) that includes service package application(s) (SPAs) relating to the features of the present invention. As a further example, the intelligent peripheral 110 may include programming or an SPA that recognizes the information from the switch 16 with respect to the in use determination of the subscriber's data service and the other information. This programming or SPA also may be used for communicating with the subscriber.

Based on the determination that data service is in use at the customer's premises 12 and possibly other information provided by the switch 16, the intelligent peripheral 110 may be connected to the voice service to the customer's premises 12 so as to provide an announcement of the impact information. The announcement may be a voice announcement that is heard by the subscriber over the receiver of his or her telecommunications device. The announcement also may include a list of modes of operation of the data service. As noted above, these modes may include a full power mode, a low power mode, a rescind mode, and a wait mode. In response to the list of modes, the subscriber selects a mode and transmits this selection to the telecommunications network. For example, the subscriber may be prompted to push a certain keypad on the telecommunications device if the subscriber desires full power mode, a different keypad if the customer desires low power mode, etc. As a result of the push of a keypad, a dual tone multiple frequency (DTMF) signal is transmitted in a conventional manner to the telecommunications network, and in particular, to the intelligent peripheral 110. The intelligent peripheral 110 receives the selected mode and provides the ADSL system with instructions to operate the data service pursuant to the selected mode. In particular, these instructions may be provided to the ADSL modem 18 for execution. In response to the instructions, the ADSL system operates the data service pursuant to the selected mode of operation. Advantageously, the data service is operated in a mode selected by the subscriber that best suits the subscriber's purposes and circumstances.

Figure 1:
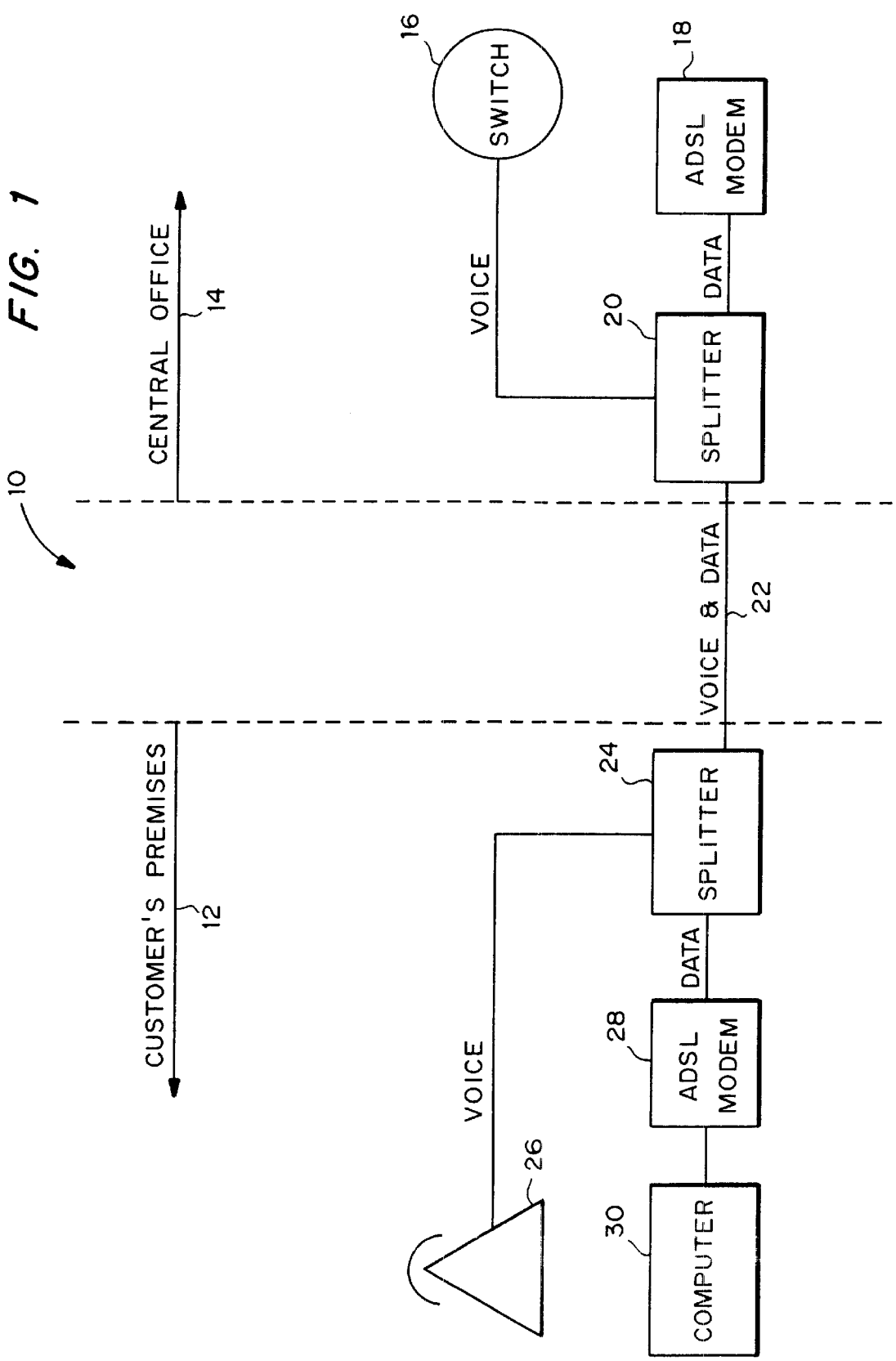
FIG. 1 illustrates an ADSL system with a splitter in the customer's premises.

In sum, the ADSL system 106 illustrated in FIG. 5 functions generally as the ADSL systems 10, 32 illustrated in FIGS. 1, 2. Voice signals and data signals are combined in the central office 14, and transmitted over conventional twisted pair wiring 22 to a customer's premises 12. At the customer's premises 12, the voice signals and data signals are split and are delivered respectively to the subscriber's voice devices 26 and data devices 30. But the ADSL system 106 includes features of the exemplary embodiments of the present invention that allow a subscriber to intelligently manage the use of data service and/or voice service in the ADSL system 106. The management of these services allowed by the exemplary embodiments is described below in connection with the ADSL system 106 illustrated in FIG. 5 and with two examples that are explained in connection with the flow diagram of FIG. 6.

Figure 6:
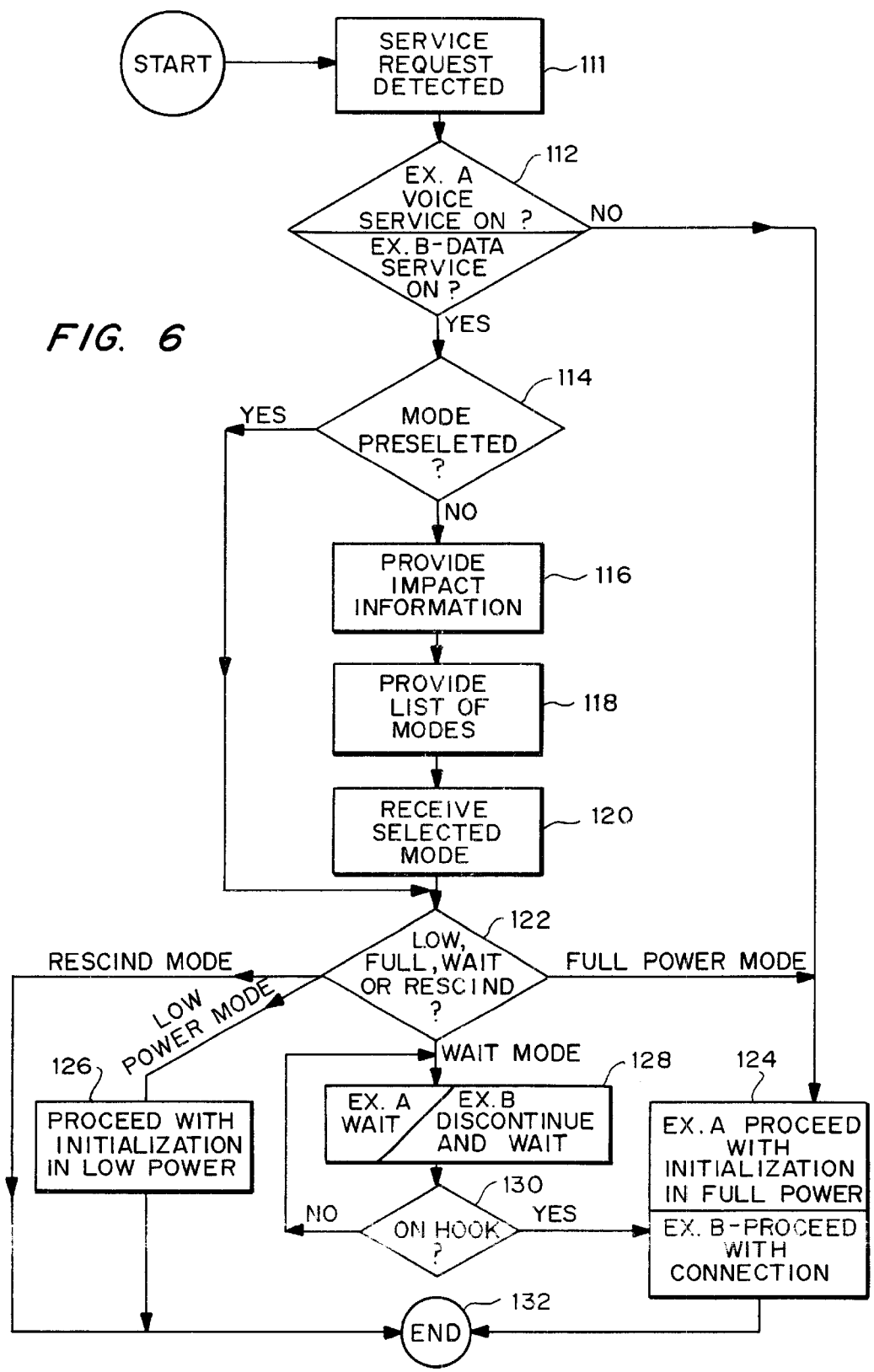
FIG. 6 is a flow diagram with additional detail of an exemplary embodiment.

EXAMPLE A
Request for Data Service in Light of Use of Voice Service—FIGS. 5–6

FIG. 6 is a flow diagram presenting the steps of an exemplary method wherein a subscriber to an ADSL system is using one service and he or she desires to add the other service. For this example A, referring to FIG. 6, assume the subscriber is using voice service and he or she desires to add data service. In particular, assume the subscriber is using a telephone 26 to converse with a business colleague 109 and the details of the business they are discussing require the subscriber to use his or her computer 30 to view some information at a website on the Internet.

Referring to the FIG. 6, as a start, the subscriber powers up his or her personal computer 30 and begins to take steps to connect to the Internet. These steps constitute a request for data service because a connection to the Internet requires the data service of the subscriber's ADSL system 106. This request for service is detected in step 111. The detection may take place at the computer 30. For example, in subscribing to the ADSL system 106, the subscriber may be provided with programs or applications for installation on his or her computer so as to provide an interface to the ADSL system 106 and so as to deliver some of the advantageous features of the exemplary embodiments of the present invention. Alternatively, the detection may take place at the ADSL modem 28. For example, the ADSL modem 28 may be programmed to interface with the subscriber's data devices 30 and to effect delivery of some of the advantageous features of the exemplary embodiments. As yet another alternative, the ADSL modem 28 may be separately "powered on" into one of several states such as full power or power-save.

Once a request for service is detected, in step 112 a check is conducted to determine whether voice service is currently being provided to the subscriber. In particular, a check is made to determine whether any telecommunication devices 26 of the subscriber have an off hook indication which would indicate that voice service is "on" with respect to the ADSL system 106. This check may be carried out in several different ways.

Referring to FIG. 6, one way to carry out the check would be to place a low pass filter (LPF) 107 on the voice and data line 22 of the ADSL system 106 which provides voice service and data service to the customer's premises 12. The low pass filter 107 allows voice band signals to reach the ADSL modem 28 and the electrical impedance can be used to detect an off-hook status.

In the check step 112, if the check results in a negative determination that no telecommunications device 26 has an off-hook indication, then in step 124 the computer 30 (or other data device such as the ADSL modem 28) may proceed in a conventional manner with initialization and connection to its corresponding ADSL modem 18 in the central office 14 serving the subscriber. As a result, data service, but not voice service is used to the subscriber.

On the other hand, the check in step 112, may be positive. Advantageously, the positive result may alert the subscriber to a fact of which he or she was previously unaware, i.e., the off-hook indication of one or more of his or her telecommunication devices 26. To illustrate, without knowing it, the subscriber may not have properly hung up his or her telephone 26. Such off-hook indication results in use of the voice service of the ADSL system 106 to the customer's premises. Once informed of the off-hook indication, the subscriber may hang up the telephone 26 and continue with the use of only data service. By terminating the voice service, the data service may improve through increased data bit rate and in other ways.

If the check in step 112, FIG. 6 is positive, then the exemplary method may proceed to step 114 of checking whether a mode of operation has been previously chosen as a preselected mode of operation. In exemplary embodiments, the data service of the ADSL system 106 may be operated in full power mode or in low power mode. In addition, the exemplary embodiments provide a wait mode whereby the data service is not provided until the voice service is discontinued. As yet another mode, the exemplary embodiments provide the subscriber with an opportunity to rescind his or her request for service, and this is referred to as a rescind mode. Those skilled in the art will understand that other modes of operation (such as an intermediate power mode) may be added to the ADSL system and that operation of the exemplary embodiments with such added modes will proceed analogously to the description provided herein.

Typically, the full power mode (nominal signal strength) of the data service delivers data to the subscriber's data devices 30 most effectively, or in other words, at the highest data delivery speeds, etc. But the full power mode may most negatively affect the voice service that is being concurrently used by the subscriber. For example, the full power mode may cause a background noise or hum that may be heard on the line of the subscriber's telecommunication devices 26.

As its name implies, the low power mode (reduced signal strength) delivers data to the subscriber's data devices. 30 less effectively than the full power mode. The low power mode, however, may less negatively affect the voice service that is being concurrently used by the subscriber. The low power mode may not cause any background noise or only a minimal hum.

Generally, the wait mode puts the provision of data service effectively on hold until the voice service is discontinued. For example, if the subscriber selects the wait mode, then a check may be conducted periodically to determine whether voice service is still being provided to the subscriber. In other words, a check may be conducted periodically to determine whether the telecommunications device 26 of the subscriber has gone on-hook. This periodic checking may be carried out in the same manner as described above in connection with step 112, wherein the exemplary embodiment conducted a check to determine whether voice service is currently being used by the subscriber. Nonetheless, other ways of periodically checking to determine whether voice service is still being provided to the subscriber may be used. Once the exemplary embodiment determines that voice service has been discontinued, a signal or other indication may be provided so as to proceed with the initialization and use of data service by the subscriber. For example, the ADSL modem 28 may be used in connection with a low pass filter 107 and a voltage detector to monitor whether voice service has been discontinued to the subscriber's telephone 26. Once it is determined that the telephone 26 has been hung up, then the ADSL modem 28 may provide a signal to computer 30, and the ADSL modem 28 may proceed with initialization and use of data service by the subscriber.

The rescind mode allows the subscriber to rescind his or her request for service. The rescind mode may be appropriate for a subscriber who cannot tolerate negative effects that may result from the use of both voice service and data service at the same time. If the subscriber chooses the rescind mode, then the exemplary embodiment considers the request for the service to be withdrawn. No further steps with respect to the provision of data services are taken.

The subscriber may have considered the relative advantages and disadvantages of the respective modes of operation, and have preselected either the full power mode or the low power mode for use when both the data service and the voice service are being used by the subscriber. If the subscriber has preselected a mode, then the exemplary method proceeds to step 122, as is explained below. The subscriber may be provided with information of the preselected mode and an inquiry may be made as to whether the subscriber desires to proceed with the preselected mode. For example, the subscriber may be presented with a screen display on his or her computer 30 wherein the preselected mode and a "continue with preselected mode?" message box is displayed. Of course, if the subscriber selects to continue with the preselected mode, then the exemplary method proceeds to step 122. Otherwise, the exemplary method proceeds as described below.

If the subscriber has not preselected a mode, then the exemplary method proceeds to step 116. An optional feature of the exemplary method is an override feature whereby the subscriber may override the preselected mode. If the override feature is exercised, then the exemplary method proceeds to step 116, wherein impact information is provided. Impact information may include information on the service performance of each of the modes of operation. For example, the impact information may inform the subscriber that full power mode of the data service operates at a certain bits per second and low power mode operates at another bits per second.

The impact information also may include information on the performance of one service in light of concurrent use of the other service. For example, the impact information may inform the subscriber that the full power mode of the data service will operate at a certain rate and the low power mode will operate at another rate in light of concurrent use of the voice service. In addition, the impact information may include information on the effect of the one service on the other service when both services are being used concurrently. For example, the impact information may inform the subscriber that the operation of the data service in the full power mode will result in some noise or hum in the voice services. The impact information may be static in that the various elements thereof may have been previously calculated and may only serve as general approximations of service performance. The impact information also may be dynamic in that the various elements thereof may be calculated or otherwise determined in real time and only provided to the subscriber at the time of the request for the second service.

Generally, the impact information is displayed for the subscriber's consideration on the graphic user interface (GUI) of the subscriber's computer 30. Nonetheless, the impact information may otherwise be provided to the subscriber such as through an announcement made over the subscriber's telecommunications device 26.

After the impact information is provided, in step 118, a list of modes is provided. As with the impact information, the list of modes generally is displayed for the subscriber's consideration on the graphic user interface (GUI) of the subscriber's computer 30, but the list of modes may otherwise be provided. For example, the list may be announced to the subscriber through his or her telecommunications device 26. The subscriber may evaluate the impact information so as to intelligently choose the mode of operation that best suits his or her purposes or circumstances. Generally, the subscriber provides his or her selected mode by interacting with the display on the graphic user interface of the subscriber's computer 30, but the subscriber may otherwise provide a selected mode such as by communicating the selected mode over a telephone 26. For example, the subscriber may provide a selected mode (by pushing a keypad/s) on his or her telecommunications device 26 so as to provide DTMF tones corresponding to the selected mode. In step 120, the selected mode is received, and the exemplary method proceeds with steps as described below with respect to the selected mode of operation.

The available modes of operation in the exemplary embodiment have been described above as the full power mode, the low power mode, the wait mode and the rescind mode. If the full power mode is selected, then the exemplary embodiment proceeds in step 124 with initialization and operation of the data service in full power. For example, the computer 30 may provide the ADSL modem 28 with instructions to operate the data service pursuant to the full power mode as received by the computer 30 from the subscriber. The ADSL modem 28 may proceed in a conventional manner with initialization and connection to its corresponding ADSL modem 18 in the central office 14 serving the subscriber. The ADSL modem 28 may exchange information with its corresponding ADSL modem 18 that the data service is to be provided pursuant to the full power mode. Based on this information, the corresponding ADSL modem 18 operates the data service over line 22 in the full power mode to the ADSL modem 28 on the customer's premises 12. Advantageously, the subscriber is able to use both voice service and data service at the same time, and the exemplary method ends in step 132.

Similarly, if the low power mode is selected, then the exemplary embodiment proceeds in step 126 with initialization and operation of the data service in low power. For example, the computer 30 may provide the ADSL modem 28 with instructions to operate the data service pursuant to the low power mode as received by the computer 30 from the subscriber. The ADSL modem may proceed in a conventional manner with initialization and operation to its corresponding ADSL modem 18 in the central office 14 serving the subscriber. The ADSL modem 28 may exchange information with its corresponding ADSL modem 18 that the data service is to be operated pursuant to the low power mode. Based on this information, the corresponding ADSL modem 18 operates the data service over line 22 in the low power mode to the ADSL modem 28 on the customer's premises 12. The subscriber is able to use both voice service and data service at the same time, and the exemplary method ends in step 132.

If the wait mode is selected, then the exemplary method proceeds in step 128 to wait a predetermined period of time. After the time has elapsed, then in step 130 a check is made to determine whether the telecommunications device 26 of the subscriber is still in an off-hook state on whether it has gone on-hook. If the device has not gone on-hook, then the exemplary method repeats steps 128 and 130 until a positive determination is reached. Of course, those skilled in the art will understand that a time-out feature may be used to avoid lengthy waiting periods. If the subscriber has gone on-hook, then the exemplary embodiment proceeds in step 124 with initialization and operation of the data service in full power. The subscriber is able to use both voice service and data service at the same time, and the exemplary method ends in step 132.

A different ending is reached if the rescind mode is selected. In that case, the exemplary method ends in step 132, but the subscriber is using only voice service. The subscriber's request for data service is considered to be withdrawn.

In sum, the flow diagram of FIG. 6 illustrates an exemplary method whereby steps are taken upon detection of a request for data service (step 111). A check is conducted to determine whether voice service is being used (step 112). If not, then the data service is operated at full power (step 124). If voice service is being used, then a check is made to determine whether a mode has been preselected with respect to the use of the data service (step 114). If so, then the method proceeds with operation of the preselected mode (step 122). If a mode has not been preselected, then impact information is provided (step 116), a list of modes is provided (step 118), and a selected mode is received (step 120). If the full power mode is selected, then the data service is operated at full power (step 124). If the low power mode is selected, then the data service is operated at low power (step 126). If the wait mode is selected, then periodic checks to determine whether voice service has been discontinued are conducted until an on-hook condition is detected (steps 128, 130). Once the on-hook condition is detected, then the data service is operated at full power (step 124). If the rescind mode is selected, then the exemplary method ends (step 132).

Advantageously, the present invention allows a subscriber to intelligently manage the provision of data service in light of the concurrent use of voice service. Referring to example A, the subscriber who is using the telephone and desires to use data service is provided with impact information regarding the concurrent use of the data service. Based on this impact information, the subscriber may choose to use the data service in full power mode, low power mode, or in wait mode, as best suits the subscriber's purposes and circumstances. The subscriber also may choose to forego the use of the data service. With these choices, the subscriber may maximize the use of his or her ADSL system.

EXAMPLE B
Request for Voice Service in Light of Use of Data Service—FIGS. 5–6

FIGS. 5–6 also are used to illustrate the example of a subscriber who is using data service and he or she desires to also use voice service. For this example B, referring to FIG. 5, assume the subscriber is using his or her computer 30 to view some information at a website on the Internet, and the subscriber desires to call a business colleague to discuss what he or she is reading from the website.

Referring to FIG. 6, as a start, the subscriber goes off-hook with his or her telephone 26. By taking the telephone 26 off-hook, the subscriber has made a request for voice service over the subscriber's ADSL system 106. This request for service is detected in step 111, and this detection may be provided as information to the computer 30. This detection may be carried out in several ways. One way is through the use of the low pass filter 142/voltage detector (not shown) described above in connection with step 111 of example A. The indication that a change in voltage has taken place, and/or whether that change presents an off-hook indication or an on-hook indication of the telecommunication devices may be provided by programming associated with the ADSL modem 28. In turn, the ADSL modem 28 may provide the detection of the off-hook status of the telecommunications device to the computer 30.

As noted, the request for service in this example is the off-hook status of the subscriber's telephone. Thus, unlike the previous example where a check for off-hook status is conducted in check step 112, no such check of off-hook status need take place in this example B. Optionally, in this example B, a check may be conducted to determine whether data service is currently being used by subscriber. If the check results in a negative determination that no data service is being used, then in step 124 the voice service may proceed in a conventional manner with connection through the ADSL system 106 to the central office 14 serving the subscriber. As a result, voice service, but not data service is used by the subscriber.

If the check in step 112 is positive, then the computer 30 may respond by checking whether a mode of operation for the data service has been preselected in the example of voice service being requested in addition to data service being used. For example, the computer may be programmed such that when it receives a detection of the request for voice service and the computer has an indication that data service is being used, then the computer may take steps to change the mode of operation of the data service in accordance with a preselection by the subscriber. As explained above in connection with example A in step 114, the data service may be provided in full power mode, low power mode, wait mode, or rescind mode.

When data service is being provided and a request for voice service is detected, the data service may be operated in full power mode or in low power mode based on a preselected mode of operation. If the data service is operating in the preselected mode at the time the request for voice service is detected, then no change in mode of operation is necessary. A change is necessary only if the data service is not operating in the preselected mode when the request for voice service is detected. For example, if the computer is operating in the full power mode when the request for voice service is received and low power mode is the preselected mode, then the computer 30 may provide instructions to the ADSL modem 28 to change the mode of operation of the data service from the full power mode to the low power mode. The ADSL modem 28 communicates with its corresponding ADSL modem 18 to effect the change. A switch to the low power mode may have the advantageous result of causing less noise on the telephone line when voice service is provided.

Similarly, if the computer is operating in the low power mode when the request for voice service is detected and full power mode is the preselected mode, then the computer 30 may provide the appropriate instructions to the ADSL modem 28 which then carries out the interaction with the ADSL system 106. A switch to the full power mode may have the advantageous result of assuring the subscriber that the data service will continue delivery of data at a certain power level given the possible negative effects in the slow down of data rate that may occur as a result of the concurrent provision of voice service.

In Example A, the wait mode of the dta service is described as effectively an "on-hold" mode. In that Example A, a subscriber who desires to use the data service may choose the "wait mode" and effectively hold off the start of operation of data service. In Example B, data service is "on" when voice service is requested. The data service cannot be put "on hold" while the voice service is used. Rather, in this Example B, the wait mode is a mode whereby the data service is effectively turned off so as to allow the voice service to continue. Once the voice service is discontinued, then the data service is turned back on. Thus, if the wait mode is the preselected mode, the provision of data service may be effectively discontinued until the voice service is discontinued. For example, assume the subscriber has preselected the wait mode and the data service is being provided when the request for voice service is detected. In that case, the voice service is provided and the data service is effectively discontinued until the voice service is discontinued. The preselection of the wait mode may be advantageous to a subscriber who makes business calls from the home and has a family member who makes heavy use of the Internet for entertainment. The subscriber may consider the business calls to have priority over the Internet usage, and further, may require no noise or other disturbance on the telephone line. Preselection of the wait mode assures the subscriber that every time he or she picks up the telephone for a call, there will be no interference from the data service because it will be discontinued while voice service is being used.

If the rescind mode is the preselected mode, the provision of data service continues but the subscriber is provided with the opportunity of going on-hook with the telecommunications device. For example, a subscriber may be engrossed in an article that he or she is reading at a website on the Internet, and in his or her excitement, he or she may pick up the telephone to convey the excitement to a friend. The preselection of the rescind mode may result in an announcement appearing on the computer screen that prompts the subscriber to hang up the telephone. In other words, the announcement may remind the subscriber of the negative effects on the data service of the concurrent use of the voice service. In response, the subscriber may be motivated to promptly hang up the telephone, thereby rescinding the request for voice service.

If the subscriber has preselected a mode, then the exemplary method proceeds to step 122, as is explained below. The subscriber may be provided with information of the preselected mode and an inquiry may be made as to whether the subscriber desires to proceed with the preselected mode. For example, the subscriber may be presented with a screen display on his or her computer 30 wherein the preselected mode and a "continue?" message box is displayed. Of course, if the subscriber selects to continue, then the exemplary method proceeds to step 122. Otherwise, the exemplary method proceeds as described below.

If the subscriber has not preselected a mode, or exercises an override feature, then the exemplary method proceeds to step 116, wherein impact information is provided. Impact information is generally described above in connection with example A, step 116. After the impact information is provided, in step 118, a list of modes is provided. In this example B as well as in example A, the list of modes pertain to modes of operation of the data service. As noted, a subscriber may desire to change the mode of operation of the data service when he or she decides to add voice service. The list of modes generally is displayed for the subscriber's consideration on the graphic user interface (GUI) of the subscriber's computer 30, but the list of modes may otherwise be provided. The subscriber may evaluate the impact information so as to intelligently choose the mode of operation that best suits his or her purposes or circumstances. Generally, the subscriber provides his or her selected mode by interacting with the display on the graphic user interface of the subscriber's computer 30, but the subscriber may otherwise provide a selected mode such as by communicating the selected mode over a telephone.

Prior to the request for voice service, it is assumed in this example B that the data service is being used in either the full power mode or low power mode. The subscriber may desire to continue the data service in that previously provided mode rather than to change the mode. In that case, in an exemplary method, the subscriber need not indicate a selected mode. Rather, the lack of provision of a selected mode continues the operation of the data service in the previously operated mode. In an embodiment, the subscriber may be queried as to whether he or she desires to continue the data service in the previously operated mode. Appropriate steps are taken based on the response. In another embodiment, the list of modes may include "continue" as a mode which, if selected, results in continuation of the data service in the previously operated mode. If the response is positive or "continue" is selected as the selected mode, then the exemplary method proceeds with connection of the voice service, step 124.

In step 120, the selected mode is received, and the exemplary method proceeds with steps as described below with respect to the provision of the selected mode of operation.

The available modes of operation in the exemplary embodiment have been described above as the full power mode, the low power mode, the wait mode and the rescind mode. If the full power mode is selected, then the exemplary embodiment proceeds in step 124 with connection of the data service in full power as described above in connection with example A, step 124. The exemplary method ends in step 132.

Similarly, if the low power mode is selected, then the exemplary embodiment proceeds in step 126 with connection of the data service in low power as described above in connection with example A, step 126. The exemplary method ends in step 132.

If the wait mode is selected, then the exemplary method proceeds in step 128 to discontinue the data service and wait a redetermined period of time. After the time has elapsed, then in step 130 a check is made to determine whether the telecommunications device of the subscriber has gone on-hook. If not, then the exemplary method repeats steps 128 and 130 until a positive determination is reached. If the subscriber has gone on-hook, then the exemplary embodiment proceeds in step 124 with connection of the data service in full power. The exemplary method ends in step 132.

If the rescind mode is selected, the exemplary method ends in step 132. The subscriber is provided only with data service. The subscriber's request for voice service is considered to be withdrawn.

In sum, the flow diagram of FIG. 6 also illustrates an exemplary method whereby steps are taken upon detection of a request for voice service (step 111). A check may be conducted to determine whether data service is being used (step 112). If data service is not being used, then the voice service is used (step 124). If data service is being used, then a check is made to determine whether a mode has been preselected with respect to the use of the data service in light of the voice service (step 114). If so, then the method proceeds with operation of the preselected mode (step 122). If a mode has not been preselected, then impact information is provided (step 116), a list of modes is provided (step 118), and a selected mode is received (step 120). If the full power mode is selected, then the data service is operated in full power (step 124). If the low power mode is selected, then the data service is operated at low power (step 126). If the wait mode is selected, then the data service is discontinued and periodic checks to determine whether voice service has been discontinued are conducted until an on-hook condition is detected (steps 128, 130). Once the on-hook condition is detected, then the data service is resumed at full power (step 124). If the rescind mode is selected, then the exemplary method ends (step 132).

Advantageously, the present invention allows a subscriber to intelligently manage the use of data service in light of the concurrent use of voice service. Referring to example B, the subscriber whose data device is using the data service and who desires to use voice service is provided with impact information regarding the addition of the voice service. Based on this impact information, the subscriber may choose to continue with the data service in its previous mode of operation or to change the mode of data service to full power mode, low power mode, or in wait mode, as best suits the subscriber's purposes and circumstances. The subscriber also may choose to forego the addition of the voice service. With these choices, the subscriber may maximize the use of his or her ADSL system.

The exemplary embodiments of the present invention were chosen and described above in order to explain the principles of the invention and their practical applications so as to enable others skilled in the art to utilize the invention including various embodiments and various modifications as are suited to the particular use contemplated. The examples provided herein in the written descriptions or in the drawings are not intended as limitations of the present invention. Other embodiments will suggest themselves to those skilled in the art. Therefore, the scope of the present invention is to be limited only by the claims below.

I claim:

1. In an asymmetrical digital subscriber line (ADSL) system used in the local loop between a telecommunications network and a customer's premises, the ADSL system being connected to a telecommunications device at the customer's premises and providing a voice service of the ADSL system being in use with respect to the telecommunications device, and the ADSL system including an ADSL modem functionally connected to a computer at the customer's premises, a method to operate a data service of the ADSL system pursuant to a selected mode of operation of the data service, the method comprising the steps of:
   A. causing the ADSL modem to make a detection of the voice service in use with respect to the telecommunications device at the customer's premises;
   B. in response to the detection, causing the ADSL modem to provide the detection to the computer;
   C. in response to receiving the detection from the ADSL modem, causing the computer to display a list of modes of operation;
   D. receiving at the computer a selected mode from the list;
   E. causing the computer to provide the ADSL modem with instructions to operate the data service pursuant to the selected mode; and
   F. in response to receiving the instructions, causing the ADSL modem to interact with the ADSL system so as to provide the data service is operated pursuant to the selected mode of operation.

2. The method of claim 1, wherein step C comprises in response to receiving the detection from the ADSL modem, causing the computer to display information on service performance of each of the modes of operation.

3. The method of claim 1, wherein step C comprises in response to receiving the detection from the ADSL modem, causing the computer to provide impact information on performance of the data service in light of concurrent use of the voice service.

4. The method of claim 3, wherein step C comprises causing the computer to provide the impact information including effect of the data service on the voice service when the voice service is used concurrently with the data service.

5. The method of claim 1, wherein the modes of operation comprise a full power mode and a low power mode; and
   wherein step C comprises causing the computer to display the full power mode and the low power mode in the list of modes of operation.

6. The method of claim 1, wherein the modes of operation comprise a wait mode; and
   wherein step C comprises causing the computer to display the wait mode in the list of modes of operation.

7. In an asymmetrical digital subscriber line (ADSL) system used in the local loop between a telecommunications network and a customer's premises, the ADSL system being connected to a telecommunications device at the customer's premises and a voice service of the ADSL system being in use with respect to the telecommunications device, and the ADSL system including an ADSL modem functionally connected to a computer at the customer's premises, a method to operate a data service of the ADSL system pursuant to a preselected mode of operation of the data service, the method comprising the steps of:
   A. causing the ADSL modem to make a detection of the voice service in use with respect to the telecommunications device at the customer's premises;
   B. in response to the detection, causing the ADSL modem to provide the detection to the computer;
   C. in response to receiving the detection from the ADSL modem, causing the computer to check for a preselected mode of operation;
   D. in response to finding the preselected mode of operation;
   E. causing the computer to provide the ADSL modem with instructions to operate the data service pursuant to the preselected mode of operation; and
   F. in response to receiving the instructions, causing the ADSL modem to interact with the ADSL system so as to operate the data service pursuant to the preselected mode of operation.

8. In an asymmetrical digital subscriber line (ADSL) system used in the local loop between a telecommunications network and a customer's premises, the ADSL system including an ADSL modem functionally connected to a computer at the customer's premises, a data service of the ADSL system being in use through the ADSL modem to the computer, and the ADSL system also being connected to a telecommunications device at the customer's premises, a method to provide impact information on performance of the data service in light of concurrent use of a voice service of the ADSL system, the method comprising the steps of:
   A. causing the ADSL modem to make a detection of an off-hook indication with respect to the telecommunications device;
   B. in response to the detection, causing the ADSL modem to provide the detection to the computer; and
   C. in response to receiving the detection from the ADSL modem, causing the computer to provide impact information on performance of the data service in light of concurrent use of the voice service.

9. The method of claim 8, wherein step C comprises causing the computer to provide the impact information including effect of the data service on the voice service when the voice service is used concurrently with the data service.

10. The method of claim 8, further comprising the steps of:
    D. in response to receiving the detection from the ADSL modem, causing the computer to display a list of modes of operation;
    E. receiving at the computer a selected mode from the list;
    F. causing the computer to provide the ADSL modem with instructions to operate the data service pursuant to the selected mode; and
    G. in response to receiving the instructions, causing the ADSL modem to interact with the ADSL system so as to operate the data service pursuant to the selected mode of operation.

11. In an asymmetrical digital subscriber line (ADSL) system used in the local loop between a customer's premises and a telecommunications network serving the customer's premises, the ADSL system including an ADSL modem functionally connected to a computer at the customer's premises, a data service of the ADSL system being in use through the ADSL modem to the computer, and the ADSL system also being connected to a telecommunications device at the customer's premises for voice service to the telecommunications device, a method to provide impact information on performance of one service as between the data service or the voice service in light of concurrent use of the other service, the method comprising the steps of:
    A. causing a detection by the telecommunications network of an off-hook indication with respect to the telecommunications device;
    B. in response to the detection, causing the telecommunications network to make a determination that the data service is in use at the customer's premises; and
    C. in response to the determination, causing the telecommunications network to provide an announcement including impact information on performance of the one service in light of the concurrent use of the other service.

12. The method of claim 11, wherein step C comprises causing the telecommunications network to provide the announcement by including in the impact information effect of the one service on the other service when the other service is used concurrently with the one service.

13. The method of claim 11, further comprising the steps of:
   D. in response to receiving to the determination, causing the telecommunications network to announce a list of modes of operation of the data service to the telecommunications device;
   E. receiving at the telecommunications network a selected mode;
   F. causing the telecommunications network to provide the ADSL system with instructions to operate the data service pursuant to the selected mode; and
   G. in response to receiving the instructions, causing the ADSL system to operate the data service pursuant to the selected mode of operation.

14. In a telecommunications network, and particularly in an asymmetrical digital subscriber line (ADSL) system used in the local loop between the telecommunications network and a customer's premises, the ADSL system being connected to a telecommunications device at the customer's premises and a voice service of the ADSL system being in use with respect to the telecommunications device, and the ADSL system including an ADSL modem functionally connected to a computer at the customer's premises, a system to operate a data service of the ADSL system pursuant to a selected mode of operation of the data service, the system comprising:
   A. the ADSL modem being operative to make a detection of the voice service being in use with respect to the telecommunications device at the customer's premises and to provide the detection to the computer;
   B. the computer being operative, in response to receiving the detection from the ADSL modem
      i. to display a list of modes of operation,
      ii. to receive a selected mode from the list, and
      iii. to provide the ADSL modem with instructions to operate the data service pursuant to the selected mode; and
   C. the ADSL modem being further operative, in response to receiving the instructions, to interact with the ADSL system so as to operate the data service pursuant to the selected mode of operation.

15. The system of claim 14, wherein the computer is further operative, in response to receiving the detection from the ADSL modem, to provide impact information on performance of the voice service in light of concurrent use of the data service.

16. The system of claim 14, wherein the computer is also operative, in response to receiving the detection from the ADSL modem, to provide the impact information including effect of the data service on the voice service when the voice service is used concurrently with the data service.

17. In a telecommunications network, and particularly in an asymmetrical digital subscriber line (ADSL) system used in the local loop between the telecommunications network and a customer's premises, the ADSL system being connected to a telecommunications device at the customer's premises and a voice service of the ADSL system being in use with respect to the telecommunications device, the ADSL system including an ADSL modem functionally connected to a computer at the customer's premises, the ADSL system being available to provide voice service and data service to the customer's premises, and one service of the voice service or the data service being in use with respect to the customer's premises, a system to provide a choice of a selected mode of operation of the other service, the system comprising:
   A. the ADSL modem being operative to make a detection of a request for the other service and to provide the detection to the computer;
   B. the computer being operative, in response to receiving the detection from the ADSL modem
      i. to display a list of modes of operation,
      ii. to receive a selected mode from the list, and
      iii. to provide the ADSL modem with instructions to operate the other service pursuant to the selected mode; and
   C. the ADSL modem being further operative, in response to receiving the instructions, to interact with the ADSL system so as to operate the other service pursuant to the selected mode of operation.

18. The system of claim 17, wherein the computer is further operative, in response to receiving the detection from the ADSL modem, to provide impact information on performance of the one service in light of concurrent use of the other service.

19. The system of claim 17, wherein the computer is also operative, in response to receiving the detection from the ADSL modem, to provide impact information including effect of the one service on the other service when the other service is used concurrently with the one service.

20. In an asymmetrical digital subscriber line (ADSL) system between a customer's premises and a telecommunications network serving the customer's premises, the ADSL system including a first ADSL modem functionally connected through twisted pair wiring to a second ADSL modem, the first ADSL modem also being functionally connected to the telecommunications network, the second ADSL modem also being functionally connected to a computer at the customer's premises for the provision of data service to the customer's premises, and the ADSL system also being connected through the twisted pair wiring to a telecommunications device at the customer's premises for voice service to the telecommunications device, a system to provide impact information on performance of one service as between the data service or the voice service in light of concurrent use of the other service, the system comprising:
   A. a switch in the telecommunications network being operative
      to detect an off-hook indication with respect to the telecommunications device,
      to communicate with the first ADSL modem to make a determination that the data service is in use at the customer's premises, and
      to send a message to an intelligent peripheral in the telecommunications network regarding the off-hook indication; and
   B. the intelligent peripheral in the telecommunications network being operative
      to respond to the message from the switch by providing an announcement including impact information on performance of the one service in light of the concurrent use of the other service to the telecommunications device.

21. The method of claim 20, wherein the impact information comprises effect of the one service on the other service when the other service is used concurrently with the one service.

22. The method of claim 20, wherein the announcement comprises a list of modes of operation of the data service; wherein the intelligent peripheral is operative to receive a selected mode and to provide the ADSL system with instructions to operate the data service pursuant to the selected mode.

* * * * *

UNITED STATES PATENT AND TRADEMARK OFFICE
CERTIFICATE OF CORRECTION

PATENT NO. : 6,426,961 B1 Page 1 of 1
DATED : July 30, 2002
INVENTOR(S) : Prasad Nimmagadda It is certified that error appears in the above-identified patent and that said Letters Patent is hereby corrected as shown below:

Column 26,
Line 64, after "The", delete "method" and replace with -- system --.

Column 27,
Line 1, after "The", delete "method" and replace with -- system --.

Signed and Sealed this

Ninth Day of September, 2003

JAMES E. ROGAN
*Director of the United States Patent and Trademark Office*